Nov. 15, 1955     E. H. KRANTZ     2,723,404
RETRIEVER
Filed Sept. 16, 1954
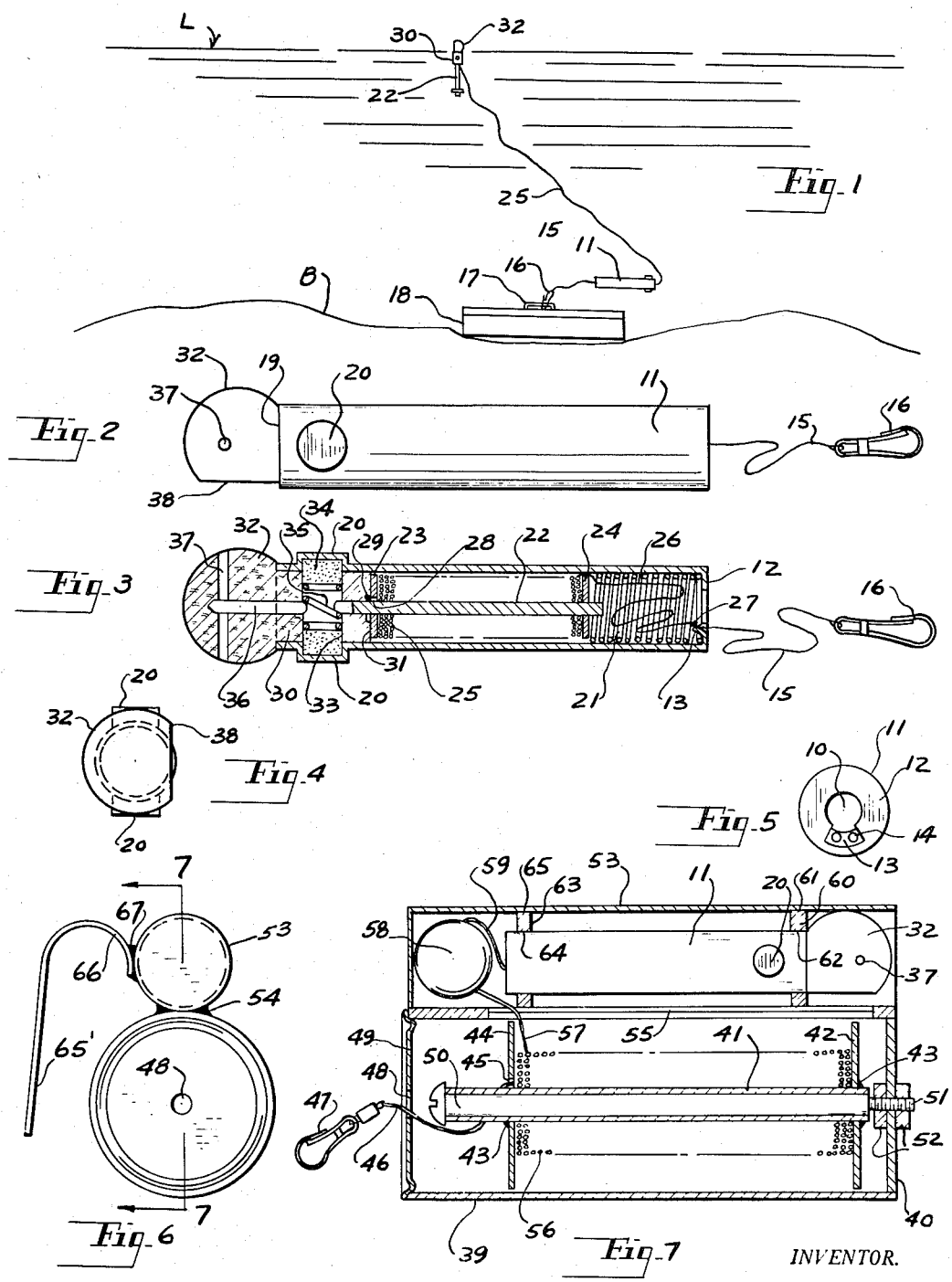
INVENTOR.
ERNEST H. KRANTZ
BY
Robert A. Sloman
ATTORNEY

2,723,404
RETRIEVER

Ernest H. Krantz, Detroit, Mich.

Application September 16, 1954, Serial No. 456,499

6 Claims. (Cl. 9—9)

This invention relates to an article retrieving device and represents an improvement in my prior Patent No. 2,588,637, dated March 11, 1952, relating to a retrieving device.

It is the object of the present invention to provide a simplified retriever which is adapted for attachment to an article which will not float and which upon the application of moisture thereto permits the spring ejection of a float carrying a line attached to the article.

It is the further object of the present invention to provide a novel structure within the retriever housing for housing water dissolvable pellets for normally retaining a spool and line within the retriever.

It is the further object of the present invention to provide an improved retrieving device whereby heavy objects such as an outboard motor may be retrieved.

These and other objects will be seen from the following specification and claims in conjunction with the appended drawing in which:

Fig. 1 is an elevational view of the present retriever as attached to an immersed tackle box and wherein the float and line have been released.

Fig. 2 is a side elevational view of a retrieving device embodying the present invention.

Fig. 3 is an elevational section thereof.

Fig. 4 is a left end view thereof.

Fig. 5 is a right end view thereof.

Fig. 6 is an end elevational view of a slightly different form of retriever; and Fig. 7 is a section taken on line 7—7 of Fig. 6.

It will be understood that the above drawing illustrates merely a preferred embodiment of the invention and that other embodiments are contemplated within the scope of claims hereafter set forth.

Referring to the drawing, the retriever of Figs. 1 through 5 includes a cylindrical housing 11, which has an end wall 12 at one end, which is centrally apertured as at 10. Adjacent said aperture a portion of said end wall is angularly bent inward as at 13 and is transversely apertured at 14. A portion of the line 15 carrying a fastening clip 16 at one end is secured to the bent wall portion 13 and tied thereto as at 27. Clip 16 is adapted for securing to any object which might be lost overboard from a boat, as for example, the handle 17 of the tackle box 18 shown in Fig. 1, wherein it is resting below the level of the water L and upon the bottom B of the body of water.

The opposite end of housing 11 is open as at 19. Adjacent the open end of said housing and formed in the wall thereof are a pair of oppositely arranged outwardly projecting bosses 20.

Coiled compression spring 21 is nested within housing 11 and bears against end wall 12. The spool 22 includes a pair of spaced discs 23 and 24 secured adjacent its opposite ends, there being coiled around said spool between said discs the continuous line 25. Said line at one end extends as at 26 through spring 21 and is tied as at 27 to end wall element 13, as above mentioned.

Transverse aperture 28 is formed adjacent the center of disc 23 for receiving the other end of line 25 which is knotted as at 29 and is glued between disc 23 and the shank 30 of the float 32. The said shank 30 is secured to the spool at 31 for movement in unison.

A transverse recess 33 is formed through shank 30 and is adapted for registry with bosses 20. The water dissolvable pellets 34 are nested within said transverse recess and partially project within the two bosses 20 for retaining the float as well as the spool within housing 11 against the compression of spring 21. A suitable coiled spring 35 is interposed between the pellets 34 for maintaining them in the outermost position shown in Fig. 3.

Axial bore 36 is formed in float 32 in communication with bore recess 33 at one end thereof. The opposite end of bore 36 centrally joins transverse bore 37 formed in float 32 to thereby establish fluid communication to the interior of housing 11 and to the pellets 34 upon immersion of the said housing.

One side of float 32 is flat as at 38 to thereby permit the said housing and float to lie against the flat surface of an object to which it may be clipped as at 16. Furthermore, in the case of a fishing rod, the said housing and float may be additionally taped to the same.

A slight variation of the present invention is shown in Figs. 6 and 7, which, nevertheless, utilizes in the manner hereinafter described the above retrieving mechanism.

The retriever shown in Fig. 7 is the type which would be used for retrieving heavy articles such as the outboard motor of a boat. This retriever consists of a hollow housing 39, which is open at one end and at its opposite end has an end wall 40. Spool 41 is loosely positioned within housing 39 and includes adjacent its opposite ends the discs 42 and 44 which are, respectively, secured to spool shaft 41 as by the welds 43.

A relatively heavy line 56 is coiled around and within the spool 41—42—44 and one end thereof extends through the central aperture 45 of spool 44 and through the aperture 48 in the removable cap 49 for housing 39, and upon the end thereof is secured a clip 47 to be anchored to some portion of an outboard motor, for illustration.

The elongated headed bolt 50 loosely extends through the tubular base 41 of the spool which is rotatably journaled thereon. The reduced threaded end 51 of shaft 50 extends through a central aperture in wall 40 and is secured thereto by the nuts 52 upon opposite sides of said wall.

A second cylindrical housing 53 is mounted directly upon housing 39 and is secured thereto as by the welds 54.

The adjacent walls of the two housings 39 and 53 are transversely slotted throughout a portion of their length as at 55 to establish communication between the interiors of said housings.

The opposite end of the heavy cord 56 as at 57 extends through slot 55 and is joined to the ball 58 positioned within one end of the second housing 53. The thinner line 25 within housing 11 corresponding to the housing shown in Fig. 3 is joined to said ball as by the conecting line 59. The construction of the third cylindrical housing 11 and its functioning is exactly the same as above described in conjunction with Figs. 2 and 3.

This third cylindrical housing 11 is positioned within housing 53 and has secured thereto adjacent its opposite ends the washers 60 and 63, which are respectively secured to the housing 11 as at points 62 and 64. The outer surface 65 of washer 63 loosely engages the wall of housing 53, whereas, the outer surface 61 of washer 60 more snugly engages the interior wall of housing 53.

In the event that the outboard motor or other heavy object connected to the retriever falls overboard and sinks, being secured by clip 47 to housing 39, will normally carry the said housing therewith to the bottom of the body of water. Upon immersion the pellets 34 of Fig. 3 and within housing 11 will be dissolved and spring 21 will operate to eject float 32 and spool 22 out through the open end of housing 53, so that said spool will rise to the top surface in the manner illustrated in Fig. 1. At this point when the line is located, the person in the boat can gradually draw on the line so as to eventually withdraw housing 11 from housing 53, at the same time unwinding the heavy cord 56 from spool 41 until the heavy cord is reached. Thereafter, the motor or other heavy object can be pulled out of the water.

There is provided as shown in Fig. 6 a mounting clip 65' whose upper end is reverse turned at 66 and is joined to housing 53 as at 67. This clip provides a convenient means for loosely mounting housings 39 and 53 to some side portion of the boat.

Having described my invention, reference should now be had to the claims which follow for determining the scope thereof.

I claim:

1. In an article retrieving device, a cylindrical housing adapted for mounting on said article open at one end and having an end wall at its opposite end, a coiled compression spring loosely positioned within said housing bearing against said end wall, a spool with a line wound therearound loosely positioned within said housing compressibly engaging said spring, there being a pair of oppositely arranged outwardly projecting hollow bosses adjacent the open end of said housing, a float having a cylindrical shank loosely nested within the open end of said housing joined to and retainingly engaging said spool against the compression of said spring, there being a transverse recess recess formed through said shank in alignment with said bosses, water dissolvable pellets within said transverse recess and retainingly projecting into said bosses, and a coiled expansion spring in said transverse recess with its opposite ends engaging said pellets, the free end of said line extending through said first coiled spring and anchored to said housing, both shank and spool being adapted for ejection from said housing under expansive action of said spring upon application of moisture to said pellets.

2. In an article retrieving device, a cylindrical housing open at one end and having an end wall at its other end, a first spool with a heavy line wound therearound rotatably journaled and loosely supported within said housing, a second cylinder open at one end being secured upon said first housing with their axes in parallel relation, their adjacent walls being transversely slotted establishing communication between said cylinders, a third housing open at one end loosely nested and retained within said second housing, a coiled compression spring within said third housing and anchored therein, a spool with a light line wound therearound loosely positioned within said third housing retainingly engaging said spring, a float with a cylindrical shank joined to said spool and nested within said third housing, and water dissolvable means in said float retainingly engaging said third cylinder for securing said spool therein, the free end of the line on said first spool extending through said transverse slot and joined to the line on said second spool.

3. The retriever of claim 2, and a ball nested within said second cylinder and interposed in the line interconnecting said spools.

4. The retriever of claim 2, there being a pair of opposed bosses formed in said third cylinder adjacent its open end and projecting therefrom within which said water dissolvable means are partially nested.

5. The retriever of claim 2, said second spool upon application of moisture thereto and dissolving of the fluid dissolvable means being adapted for resilient ejection from said third housing, said third housing being adapted for manual withdrawal from said second housing.

6. The retriever of claim 2, and a clip joined to and depending from said second housing adapted for supporting said housing upon a boat.

References Cited in the file of this patent

UNITED STATES PATENTS 2,588,637     Krantz _____ Mar. 11, 1952